United States Patent
Chongoushian

(10) Patent No.: US 11,304,189 B1
(45) Date of Patent: Apr. 12, 2022

(54) LINK 16 TIME BASE APPROACH FOR LONG RANGES

(71) Applicant: BAE Systems Information and Electronic Systems Integration Inc., Nashua, NH (US)

(72) Inventor: John H. Chongoushian, Emerson, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/294,946

(22) PCT Filed: Nov. 25, 2020

(86) PCT No.: PCT/US2020/062153
§ 371 (c)(1),
(2) Date: May 18, 2021

(51) Int. Cl.
*H04W 4/00* (2018.01)
*H04W 72/04* (2009.01)
*H04W 56/00* (2009.01)

(52) U.S. Cl.
CPC ... *H04W 72/0446* (2013.01); *H04W 56/0015* (2013.01)

(58) Field of Classification Search
CPC .................. H04W 72/0446; H04W 56/0015
USPC ...................................................... 370/329
See application file for complete search history.

(56) References Cited

U.S. PATENT DOCUMENTS

| 2010/0188286 | A1* | 7/2010 | Bickerstaff ............ G01S 19/42 |
| | | | 342/357.22 |
| 2016/0262151 | A1* | 9/2016 | Chongoushian .. H04W 72/0446 |
| 2017/0318497 | A1* | 11/2017 | Tranquilli, Jr. ....... H04W 24/04 |
| 2018/0084498 | A1 | 3/2018 | Chongoushian |
| 2018/0309523 | A1* | 10/2018 | Chongoushian ......... H04B 7/14 |
| 2018/0317247 | A1* | 11/2018 | Chongoushian ........ H04L 47/28 |
| 2020/0126435 | A1* | 4/2020 | Chongoushian ..... G08G 5/0008 |

OTHER PUBLICATIONS

International Search Report, PCT/US20/62153, dated Feb. 9, 2021, 11 pages.

* cited by examiner

*Primary Examiner* — Mang Hang Yeung
(74) *Attorney, Agent, or Firm* — Gary McFaline; Maine Cernota & Rardin

(57) ABSTRACT

An approach for transmitting and receiving Link 16 messages for long ranges and includes a Link 16 terrestrial transmitter, a Link 16 satellite receiver including an antenna, and a controller. The approach aligns the antenna to the Link 16 terrestrial transmitter to determine a minimum distance to an area of interest of the Link 16 terrestrial transmitter, thereby estimating a range of a link from the Link 16 terrestrial transmitter to the Link 16 satellite receiver. From the range, calculating the message propagation time. Providing a second, shifted, time slot at the Link 16 satellite, shifted by the message propagation time. Processing the signal from the Link 16 terrestrial transmitter in the second, shifted, time slot to produce a message from the Link 16 terrestrial transmitter, and presenting the message to a host.

19 Claims, 6 Drawing Sheets

MESSAGE EXCHANGES AT EXTENDED RANGES WITH MODIFIED TIME BASE ALIGNMENT

LINK 16 LONG RANGE ENVIRONMENT

MESSAGE TRANSMISSION / RECEPTION TIMING

MESSAGE EXCHANGES AT EXTENDED RANGES WITH CURRENT TIME BASE ALIGNMENT

MESSAGE EXCHANGES AT EXTENDED RANGES WITH MODIFIED TIME BASE ALIGNMENT

SYSTEM BLOCK DIAGRAM

METHOD

LINK 16 TIME BASE APPROACH FOR LONG RANGES

FIELD

The following disclosure relates generally to Link 16 communications and, more particularly, to a Link 16 time base device, method, or system approach for long ranges.

BACKGROUND

Link 16 is a time division multiple access (TDMA) system, which divides time into "slots" which have a length of 7.8125 milliseconds or a frequency of 128 Hz. Link 16 Terminals are programmed with initialization data that allocates to each terminal its access to the network. Access to the network is scheduled by assigning time slots with a specific activity: transmit, receive, or relay. A network planner pre-plans this activity for all of the users in a network and the amount and types of data exchanges are based on the users' Information Exchange Requirements (IER)s. For Link 16 to effectively exchange data, all terminals must have an accurate estimate of network time. In addition to Link 16's ability to communicate, Link 16 also provides the capability to enhance the navigation solution for its users by applying pseudo-range measurements of Precise Participation Location and Identification (PPLI) messages to the navigation solution. This additional feature of Link 16 which makes it more than just a "radio" requires precision timing accuracies (<20 nanoseconds) and drives the requirement for an accurate estimate of the network time base.

Link 16 Terminals require an accurate estimation of network time to perform the communication and navigation functions required of the data link. The process to acquire and maintain network time is known herein as the synchronization process and can described as having three states: Initial Entry State, Coarse Synchronization State, and Fine Synchronization State.

There are multiple synchronization methods that a Link 16 terminal can use (active or passive, External Time Reference or Round Trip Timing) for the coarse synchronization and fine synchronization states, but the Initial Entry Process is the same for all Link 16 synchronization methods.

A Link 16 network is considered as a group of nodes that are exchanging messages operating on a single time base. Link 16 nodes fall into one of two categories for time base management. A user is either a Network Time Reference (NTR) or a user. A Link 16 network should only contain one NTR and all of the users in that network should be referenced from that NTR or another user terminal, which is in line of sight of the NTR. With the ability to synchronize to an External Time Reference (ETR) source, a Link 16 user does not need to receive a message from the network to be synchronized to it. When ETR is selected as the method for time base synchronization, users have the option to select NTR or user. Selecting NTR as the option allows the terminal to skip the initial entry process which allows them synchronize to the external source without receiving a message from the network.

For this case, this terminal will operate a Net Time reference (NTR) using External Time Reference. For this mode of operation, the Link 16 waveform synchronizes its time base to the one pulse per second (PPS) signal, and time data provided by an external time reference (e.g. GPS). Once synchronized, Link 16 exchanges messages to participants and performs pseudo range measurements on these messages.

Link 16 uses the pseudo range measure for only two of these messages: Round Trip Timing (RTT) and Precise Participant Location and Identification (PPLI). These measurements are used to maintain the time base synchronization and navigation accuracy of Link 16.

Message Exchange: Link 16 supports three different message lengths (72, 258, and 444 pulses) which are 936, 3358, and 5778 microseconds in length, respectively. The 72-pulse message is the RTT message, which is primarily used for time base maintenance. The data payloads are exchanged using 258 (Standard or Packed-2 single pulse) and 444 (Packed-2 double pulse or Packed-4 single pulse) variants, which are selected by the waveform based on the payload requirements.

All Link 16 terminals know apriori the transmit time for the messages based on TRANSEC data. With the time slots aligned and knowledge of the transmit time of the message by receiving terminal, the receiving terminal is able to calculate the propagation time of the message. Link 16 supports two different range modes, 0-300 NM and 0-500 NM. As part of the network planning activity, the range limit is made prior to using the terminal. The 0-500 NM range option of Link 16 is rarely used operationally. Link 16 terminals are designed to complete a message reception in the same time slot that was used for transmission. Terminals may be initialized to transmit in an adjacent time slot and are unable to receive while transmitting. The requirement to complete the message exchange in the same time slot limits the amount of time that can be used for propagation delay.

What is needed is a device, method, and system to allow fielded Link 16 terminals to exchange Link 16 messages at extreme ranges (e.g. satellite) without changes.

SUMMARY

An embodiment provides a method operable by a Link 16 transmitting terminal and a Link 16 receiving terminal for transmitting and receiving Link 16 messages for long comprising at least one unmodified legacy Link 16 terrestrial terminal (530) in a terrestrial network that operates without any modification from a legacy Link 16 messaging protocol; at least one modified Link 16 terminal that performs steps of aligning an antenna (510) of a satellite Link 16 terminal (505) to the Link 16 unmodified terrestrial terminal (530); providing a second, advanced, time slot at the satellite terminal (505) for transmissions; shifting a time slot mark of the satellite terminal by a message propagation time using satellite ephemeris data to determine a range; at the Link 16 satellite terminal (505), processing the transmitted signal in the shifted time slot to produce a message from a transmitter of the unmodified terrestrial terminal (530); and presenting the message to a host. In embodiments the Link 16 transmitting terminal comprises a terrestrial Link 16 transmitting terminal (530); and the Link 16 receiving terminal comprises a satellite Link 16 receiving terminal (505). In other embodiments, message exchange is required to be completed in a same time slot. In subsequent embodiments the Link 16 transmitting and receiving terminals are unable to receive while transmitting. For additional embodiments the second, advanced, time slot is a one slot advanced time slot. In another embodiment, a beam width of the antenna is approximately 16 degrees. For a following embodiment a gain of the antenna is approximately 23 dB. In subsequent embodiments the message propagation time comprises a propagation delay to a Low Earth Orbiting (LEO) satellite at a 1000 km orbit. In additional embodiments the message propagation time ranges from 3,340 microseconds, wherein the Link 16 receiver is directly overhead of the Link 16 transmitting terminal, to 7,558 microseconds for a Link 16 receiving terminal 2500 km away. In included embodiments the method comprises shifting the shifted time slot by 3.3 milliseconds. In yet further embodiments the method comprises receiving a message using satellite ephemeris data to calculate the time slot mark time shift. In related embodiments each Link 16 terrestrial ground terminal (530) is an unmodified terrestrial ground terminal. For further embodiments the transmitted signal comprises an L-band frequency. In ensuing embodiments the transmitted signal comprises a signal in space protocol defined in STANAG 4175.

Another embodiment provides a method operable by a Link 16 transmitting terminal and a Link 16 receiving terminal for transmitting and receiving Link 16 messages for long ranges comprising starting a Link 16 time base synchronization (605); initializing a Link 16 terminal with a mission plan (610); getting UTC time from a GPS constellation (615); synchronizing the Link 16 time base to GPS time (620); determining a slot shift using satellite ephemeris data (625); aligning an antenna (510) of a Link 16 satellite terminal (505) to an unmodified legacy Link 16 terrestrial terminal target (630); verifying reception of at least one fixed format Link 16 message (635); initiating a dual time base with transmit time slots one slot ahead of actual time base (640), whereby time base synchronization is complete (645); and presenting the message to a host (650). For yet further embodiments, the mission plan comprises range mode, source track number, time reference, and time slot assignments. For more embodiments, the synchronizing Link 16 time base to GPS time comprises a resolution of 1 pulse per second (PPS). In continued embodiments all Link 16 terrestrial terminals (530) are unmodified legacy Link 16 terminals. Additional embodiments further comprise a computer program product including one or more machine-readable mediums encoded with non-transitory instructions that, when executed by one or more processors, cause a process of transmitting and receiving Link 16 messages for long ranges.

A yet further embodiment provides an apparatus configured for transmitting and receiving Link 16 messages for long ranges, the apparatus comprising at least one Link 16 transmitter (515, 540); at least one Link 16 receiver (515, 540) to receive signals from the transmitter; the at least one Link 16 receiver comprising an antenna (510, 535); and a controller comprising a subroutine running on a Link 16 application processor configured to align the antenna (510), using ephemeris data, of one of the at least one link 16 receivers to one of the at least one Link 16 transmitters; calculate a message propagation time; provide a second, advanced, time slot for satellite transmission; shift a time slot boundary by the message propagation time, calculated from the ephemeris data; process the signal from the one of the at least one link 16 transmitters in the shifted time slot to produce a message from the one of the at least one Link 16 transmitters; and present the message to a host; wherein the apparatus comprises at least one unmodified legacy Link 16 terrestrial terminal (530); and whereby the at least one unmodified legacy Link 16 terrestrial terminal (530) does not require knowledge of the Link 16 transmitter's positon or propagation delay.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments modify the time base of the terminal outside of the range of the main network. All Link 16 terminals synchronize to a common time base (either a single terminal in the network known as a time reference, or externally to GPS). Embodiments skew the Link 16 time slot boundary to account for the extended propagation time allowing receiving terminals to receive the message that is within the 300 NM range of Link 16. This solution allows all fielded Link 16 terminals (>10,000) to communicate with the modified terminal at extreme ranges without any changes. Long or extended ranges in one example are greater than 300 NM. In another example the long or extended ranges are greater than 500 NM range.

Figure 1:
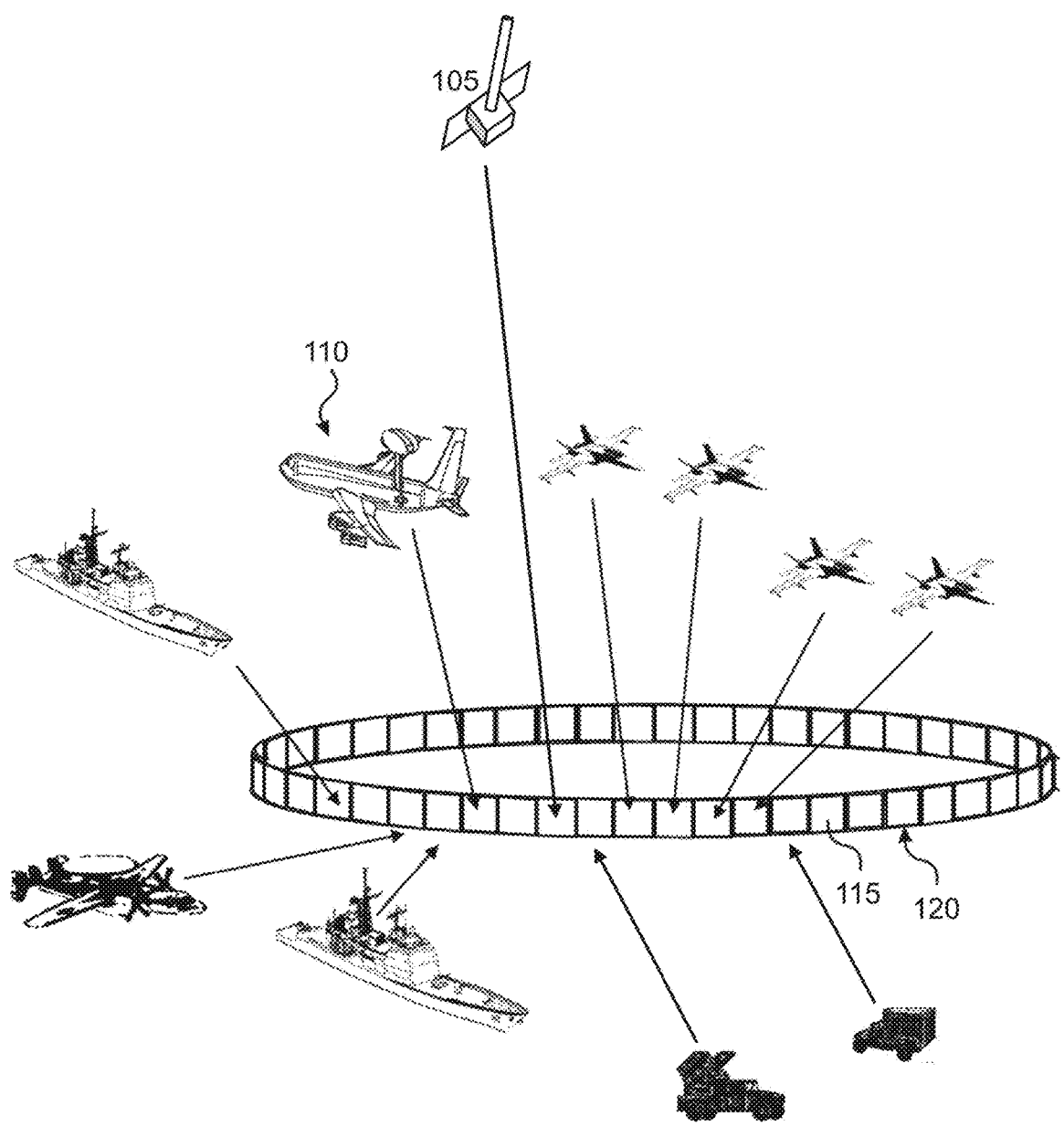
FIG. 1 depicts a Link 16 long range environment configured in accordance with an embodiment.

FIG. 1 depicts a Link 16 long range environment 100. Shown are satellite terminal(s) 105 and terrestrial terminal station(s) 110. Blocks 115 in ring 120 represent time slots. Each Link 16 participant terminal 105, 110 is initialized by a network planner (not shown) prior to start of a mission with a unique identifier, known as the Source Track Number (STN), and time slot assignments that indicate the types and amounts of data to be exchanged across the network.

Figure 2:
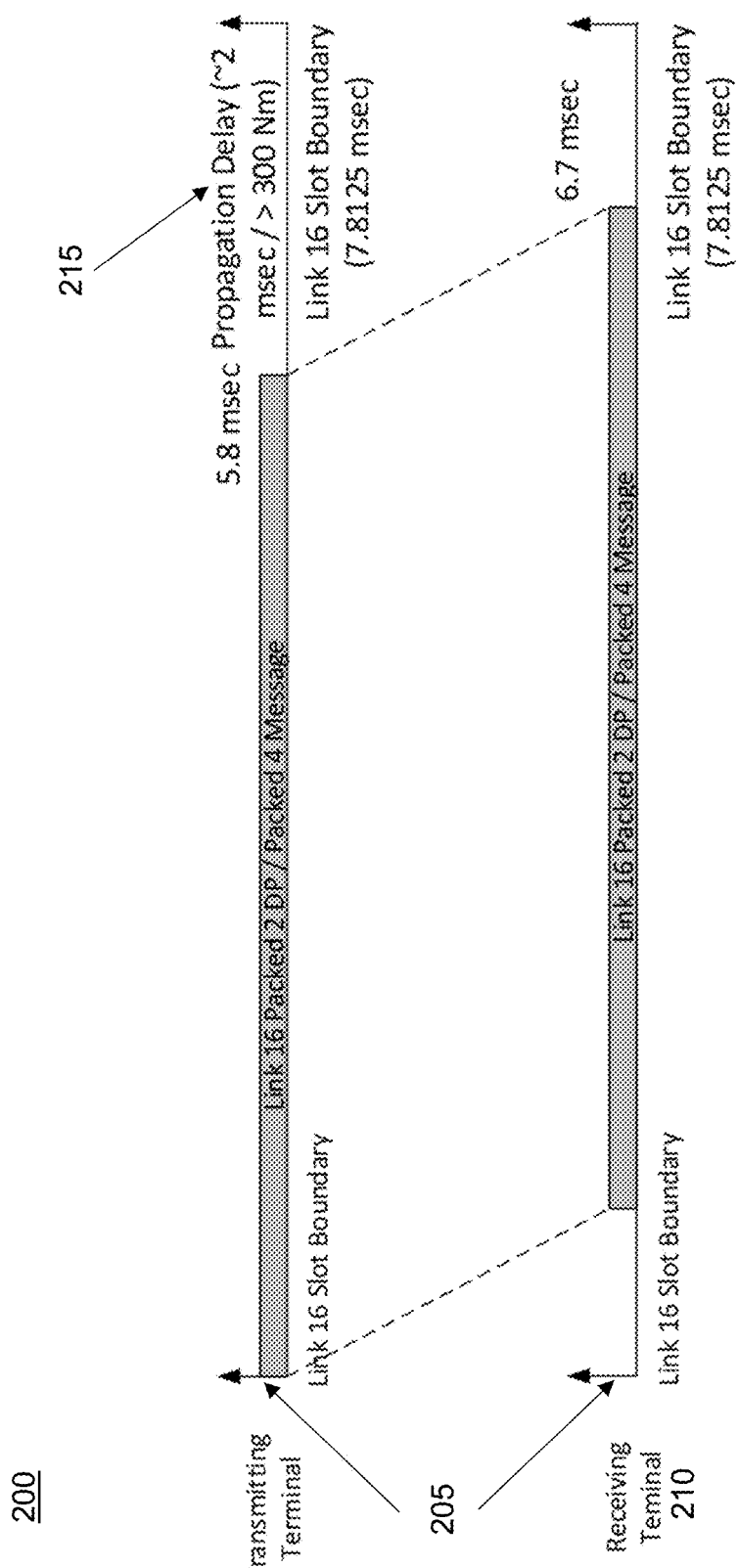
FIG. 2 illustrates message transmission/reception timing configured in accordance with an embodiment.

FIG. 2 illustrates the message transmission/reception timing 200 for a 444 pulse message and reception by that message with a terminal at ~150 NM. The arrows upward 205 in the figure show the time slot boundaries aligned for both terminals. As mentioned, Link 16 terminals know apriori the transmit time for the messages based on TRANSEC data. With the time slots aligned and knowledge of the transmit time of the message by receiving terminal 210, the receiving terminal 210 is able to calculate the propagation time 215 of the message. Also as mentioned, Link 16 typically supports two different range modes, 0-300 NM and 0-500 NM. As part of the network planning activity, the range limit selections are made prior to using the terminal. The 500 NM range option of Link 16 is rarely used operationally. Repeaters can sometimes be used to extend range. Link 16 terminals are designed to complete a message reception in the same time slot that was used for transmission. Terminals may be initialized to transmit in an adjacent time slot and are unable to receive while transmitting. The requirement to complete the message exchange in the same time slot limits the amount of time that can be used for propagation delay.

With the need to provide beyond Line of sight (BLOS) exchanges of Link 16 messages (TADIL-J), there have been several protocols developed to provide TADIL-J messages to satellites (e.g. Joint Range Extension Applications Protocol (JREAP)). This protocol uses another communications system as the physical system and exchanges the TADIL-J data received from Link 16. MIL-STD-3011 describes the JREAP protocol.

With the emerging requirement to exchange Link 16 data to a satellite, using the signal in space protocols defined in STANAG 4175, two major limitations of Link 16 need to be resolved. The first is the link budget and the second is the system timing.

The Link 16 link budget was designed to meet a 300 NM range using an Omni-directional antenna. Fielded use of the system shows that with two Omni-directional systems each transmitting at 200 W peak power, the range is between 200 to 300 NM. For an extended range system such as a satellite, it would be applicable to use a directional antenna since the satellite would be targeting a specific area of interest at any one time. If the area to cover were a circle with a diameter of 150 NM range, a low earth orbiting (LEO) satellite (1000 km altitude) would require an antenna with a beam width of ~16 degrees. Theoretically, an antenna with this beam width could provide a gain of ~23 dB.

The other issue is the slot timing. The propagation delay to a LEO satellite at a 1000 km orbit can range from 3,340 microseconds (directly overhead) to 7,558 microseconds if the satellite is 2500 km away. With a conventional time base alignment communication at these extended ranges is impossible.

Figure 3:
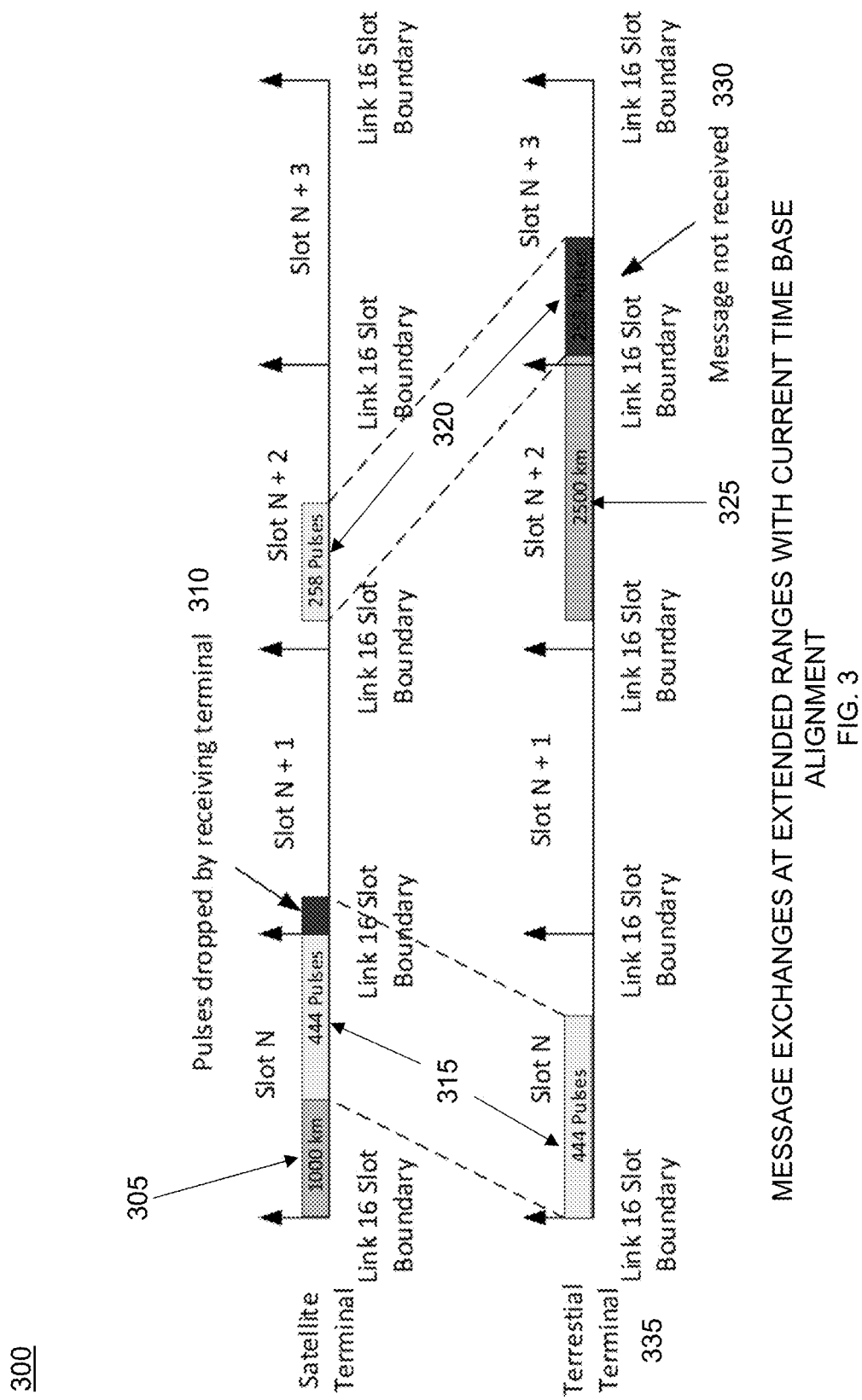
FIG. 3 depicts message exchanges at extended ranges with current time base alignment configured in accordance with an embodiment.

FIG. 3 depicts message exchanges at extended ranges with current time base alignment 300. It shows that communication can occur at the 1000 km range 305 with some loss 310 for 444 pulse messages 315. The shorter 258 pulse message 320 has a pseudo-random "jitter" applied to it which can extend the completion of the transmission to 5.15 milliseconds which is shorter than the 444 pulse message 315 shown in the example. At longer ranges (note the 2500 km range 325), the 258 pulse message 320 with no jitter would not be received 330 by the terrestrial network terminal on the ground 335.

Figure 4:
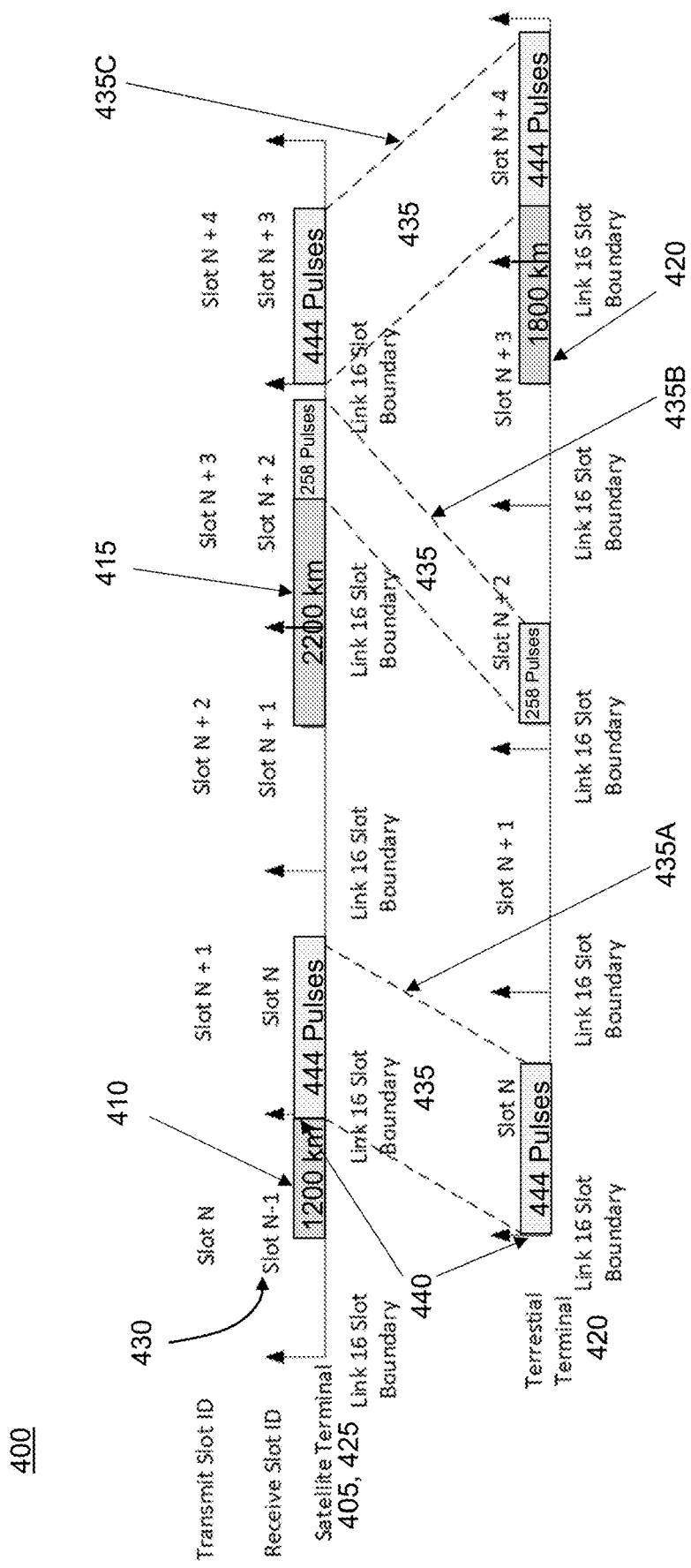
FIG. 4 depicts message exchanges at extended ranges with modified time base alignment configured in accordance with an embodiment.

FIG. 4 illustrates the approach 400 provided in embodiments to alter the timing of the satellite terminal 405 by skewing the time slot boundary by a value that is equal to the minimum distance to the area of interest. For example, 1200 km 410, 2200 km 415, and 1800 km 420. In embodiments, this requires that the satellite terminal 425 also maintain a second slot identification 430, where the time slot is normal for receive, and advanced for transmit 435 to process messages from the terrestrial ground based network terminal 420. Particular slot examples 435A, 435B, and 435C correspond to the example minimum distances to the areas of interest 410, 415, and 420, respectively.

For this example, the satellite terminal 425 shifts its end of slot time mark 440 by 3.3 milliseconds (which is the propagation delay of the closet range of the satellite, corresponding to 1200 km 410 here). The other change is the notion of two slot identifications, transmit (which is the current) and receive (which will always be looking to receive a message using the previous time slots TRANSEC data. In this configuration, the timing of the messages aligns with both the terrestrial ground terminals 420 (which are unmodified) and the satellite for both directions.

Broader ranges can be managed by adjusting the time slot delta based on the expected propagation delay. Since the satellite will be required to point its high gain antenna, it will be able to determine the expected propagation delay for the Link 16 message exchanges.

Figure 5:
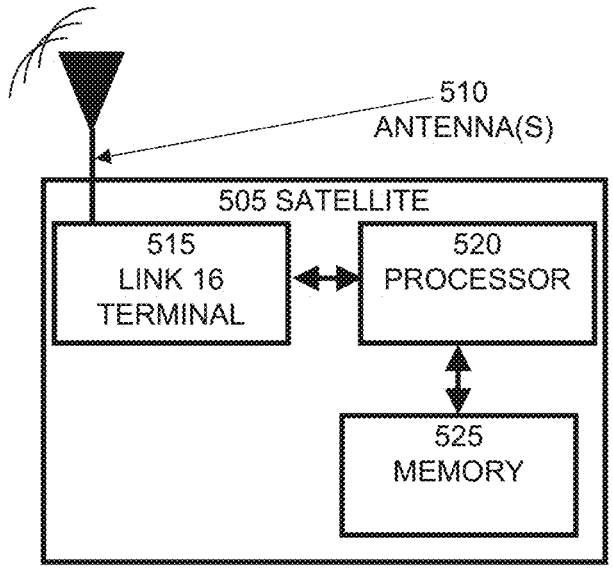
FIG. 5 depicts system block diagram device components for the Link 16 time base approach for long ranges configured in accordance with an embodiment.
Figure 5:
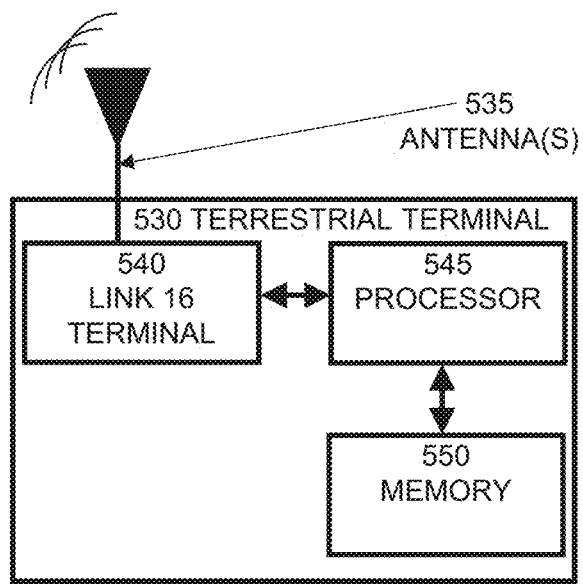

FIG. 5 depicts system block diagram device components 500 for the Link 16 time base approach for long ranges. Components comprise a Link 16 (satellite) receiving terminal 505 comprising an antenna 510; a Link 16 terminal 515; a processor 520; and memory 525; and a Link 16 (terrestrial) transmitting terminal 530 comprising an antenna 535; a Link 16 terminal 540; a processor 545; and memory 550. Component functions comprise Link 16 (satellite) terminal 505 operating communications with Link 16 (terrestrial) terminal 530. Link 16 (satellite) terminal antenna 510; is directed toward Link 16 (terrestrial) terminal antenna 535. Satellite Link 16 terminal 515 receives Link 16 signals from antenna 510. Processor 520 and memory 525 perform operations with the Link 16 messages. Terrestrial Link 16 terminal 540 receives Link 16 signals from antenna 535. Processor 545 and memory 550 perform operations with the Link 16 messages.

Figure 6:
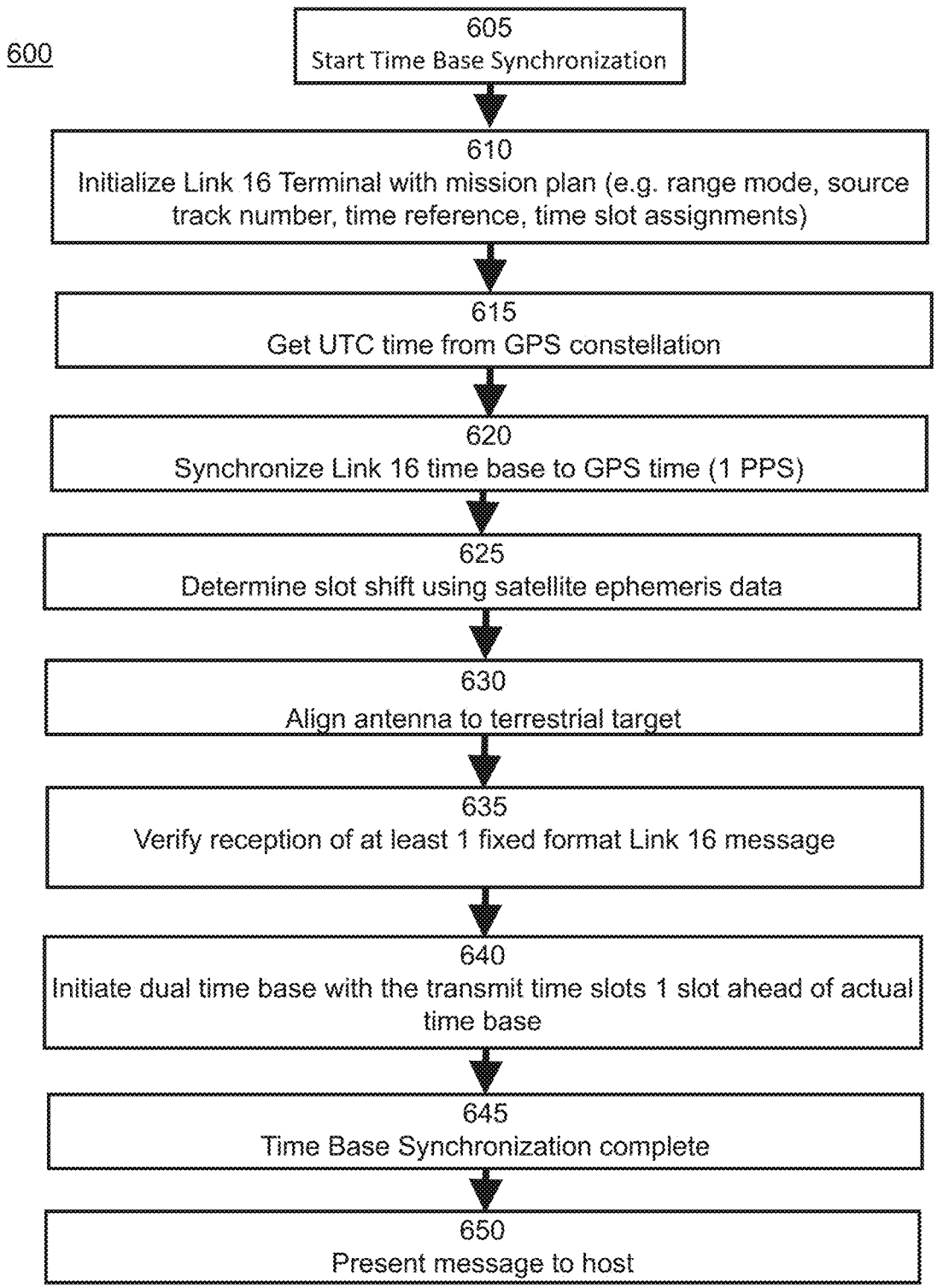
FIG. 6 depicts a method flow chart for the Link 16 time base approach for long ranges configured in accordance with an embodiment.

FIG. 6 depicts a method flow chart 600 for the Link 16 time base approach for long ranges such as greater than 500 NM. Method steps comprise: Start Time Base Synchronization 605 refers to establishing the basis for communications between satellite and terrestrial terminals. Initialize Link 16 Terminal 610 refers to initializing the link with the mission plan (e.g. range mode, source track number, time reference, time slot assignments). Get UTC time 615 refers to obtaining the time from the GPS constellation. Synchronize Link 16 620 refers to synchronizing the Link 16 time base to GPS time (1 PPS). Determine slot shift 625 refers to determining the slot shift using satellite ephemeris data. Align antenna 630 refers to aligning the antenna to the terrestrial target. Verify reception 635 refers to verifying the reception of at least 1 fixed format Link 16 message. Initiate dual time base 640 refers to initiating the dual time base with the transmit time slots 1 slot ahead of the actual time base. Time Base Synchronization complete 645 refers to the end of the synchronization process. Present message to host 650 refers to presenting the time-shifted Link 16 message to the intended host recipient.

The computing system used for the Link 16 time base approach for long ranges such as greater than 500 NM for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method operable by a Link 16 transmitting terminal and a Link 16 receiving terminal for transmitting and receiving Link 16 messages comprising:
    at least one unmodified legacy Link 16 terrestrial terminal (530) in a terrestrial network that operates without any modification from a legacy Link 16 messaging protocol;
    at least one modified Link 16 terminal that performs steps of:
    aligning an antenna (510) of a satellite Link 16 terminal (505) to said Link 16 unmodified terrestrial terminal (530);
    providing a second, advanced, time slot at said satellite terminal (505) for transmissions;
    shifting a time slot mark of said satellite terminal by a message propagation time using satellite ephemeris data to determine a range;
    at said Link 16 satellite terminal (505), processing said transmitted signal in said shifted time slot to produce a message from a transmitter of said unmodified terrestrial terminal (530); and
    presenting said message to a host.

2. The system of claim 1 wherein said Link 16 transmitting terminal comprises a terrestrial Link 16 transmitting terminal (530); and
    said Link 16 receiving terminal comprises a satellite Link 16 receiving terminal (505).

3. The method of claim 1 wherein message exchange is required to be completed in a same time slot.

4. The method of claim 1 wherein said Link 16 transmitting and receiving terminals are unable to receive while transmitting.

5. The method of claim 1 wherein said second, advanced, time slot is a one slot advanced time slot.

6. The method of claim 1 wherein a beam width of said antenna is approximately 16 degrees.

7. The method of claim 1 wherein a gain of said antenna is approximately 23 dB.

8. The method of claim 1 wherein said message propagation time comprises a propagation delay to a Low Earth Orbiting (LEO) satellite at a 1000 km orbit.

9. The method of claim 1 wherein said message propagation time ranges from 3,340 microseconds, wherein said Link 16 receiver is directly overhead of said Link 16 transmitting terminal, to 7,558 microseconds for a Link 16 receiving terminal 2500 km away.

10. The method of claim 1 wherein said method comprises shifting said shifted time slot by 3.3 milliseconds.

11. The method of claim 1 wherein said method comprises receiving a message using satellite ephemeris data to calculate said time slot mark time shift.

12. The method of claim 1 wherein each Link 16 terrestrial ground terminal (530) is an unmodified terrestrial ground terminal.

13. The method of claim 1 wherein said transmitted signal comprises an L-band frequency.

14. The method of claim 1 wherein said transmitted signal comprises a signal in space protocol defined in STANAG 4175.

15. A method operable by a Link 16 transmitting terminal and a Link 16 receiving terminal for transmitting and receiving Link 16 messages comprising:
    starting a Link 16 time base synchronization (605);
    initializing a Link 16 terminal with a mission plan (610);
    getting UTC time from a GPS constellation (615);
    synchronizing said Link 16 time base to GPS time (620);
    determining a slot shift using satellite ephemeris data (625);
    aligning an antenna (510) of a Link 16 satellite terminal (505) to an unmodified legacy Link 16 terrestrial terminal target (630);
    verifying reception of at least one fixed format Link 16 message (635);
    initiating a dual time base with transmit time slots one slot ahead of actual time base (640), whereby time base synchronization is complete (645); and
    presenting said message to a host (650).

16. The method of claim 15 wherein said mission plan comprises range mode, source track number, time reference, and time slot assignments.

17. The method of claim 15 wherein said synchronizing Link 16 time base to GPS time comprises a resolution of 1 pulse per second (PPS).

18. The method of claim 15 wherein all Link 16 terrestrial terminals (530) are unmodified legacy Link 16 terminals.

19. An apparatus configured for transmitting and receiving Link 16 messages, the apparatus comprising:
    at least one Link 16 transmitter (515, 540);

at least one Link 16 receiver (515, 540) to receive signals from said transmitter;
said at least one Link 16 receiver comprising an antenna (510, 535); and
a controller comprising a subroutine running on a Link 16 application processor configured to:
 align said antenna (510), using ephemeris data, of one of said at least one link 16 receivers to one of said at least one Link 16 transmitters;
 calculate a message propagation time;
 provide a second, advanced, time slot for satellite transmission;
 shift a time slot boundary by said message propagation time, calculated from said ephemeris data;
 process said signal from said one of said at least one link 16 transmitters in said shifted time slot to produce a message from said one of said at least one Link 16 transmitters; and
 present said message to a host;
wherein said apparatus comprises at least one unmodified legacy Link 16 terrestrial terminal (530); and
whereby said at least one unmodified legacy Link 16 terrestrial terminal (530) does not require knowledge of said Link 16 transmitter's positon or propagation delay.

* * * * *